United States Patent [19]

Schröder et al.

[11] Patent Number: 4,474,847

[45] Date of Patent: Oct. 2, 1984

[54] RECORDING PAPER FOR INK JET RECORDING PROCESSES

[75] Inventors: Heinz Schröder, Duren; Georg Schupp, Hurtengewald-Gey, both of Fed. Rep. of Germany

[73] Assignee: Felix Schoeller, Jr. GmbH & Co. K.G., Osnabruck, Fed. Rep. of Germany

[21] Appl. No.: 468,559

[22] Filed: Feb. 22, 1983

Related U.S. Application Data

[63] Continuation of Ser. No. 270,339, Jun. 4, 1981, abandoned.

[30] Foreign Application Priority Data

Jun. 27, 1980 [DE] Fed. Rep. of Germany ....... 3024205

[51] Int. Cl.³ ........................ B32B 5/16; G01D 15/34

[52] U.S. Cl. ................................ 428/323; 346/135.1; 428/207; 428/211; 428/328; 428/329; 428/330; 428/331; 428/342; 428/537.5; 162/134

[58] Field of Search ............................ 346/1.1, 135.1; 400/126; 427/261, 288; 428/207, 211, 323, 328, 329, 342, 537, 330, 331, 340, 341

[56] References Cited

U.S. PATENT DOCUMENTS 4,269,891 5/1981 Minagawa .......................... 428/335

*Primary Examiner*—Bruce H. Hess

*Attorney, Agent, or Firm*—Lockwood, Dewey, Alex & Cummings

[57] ABSTRACT

A coated base paper for use in an ink jet recording process exhibits excellent ink solution spreading and wipe resistance. The coating comprises a pigment and/or filler of non-flake structure, and a binding agent dried on the paper. The pigment content is at least about 90% by weight of the dried coating and has a particle mean diameter of about 0.05–4.0 μm. The binding agent is predominantly hydrophilic.

25 Claims, 3 Drawing Figures

RECORDING PAPER FOR INK JET RECORDING PROCESSES

This is a continuation of application Ser. No. 270,339, filed June 4, 1981, now abandoned.

BACKGROUND AND SUMMARY OF THE INVENTION

This invention relates to a coated paper which is suitable as a recording sheet for use in an ink jet recording process.

Rapidly and noiselessly operating printers have been developed, in which, by the selective excitation of piezoelectric transducers, ink droplets are ejected from nozzles of a writing nozzle matrix controlled to produce a desired writing pattern (See "Siemens-Zeitschrift," 51st year, 1977, pages 219–221). Printers of this class achieve writing speeds of up to 300 symbols per second. Such high writing speeds impose particular requirements upon the paper used in the printer. The ink droplets are ejected from the nozzles, which have a diameter of approximately 0.1 mm upon leaving the nozzle, strike at high speed on the substrate and are intended to there spread out within about 1–3 seconds to a circular area of about 0.3–0.4 mm in order that cohesive symbols will result. Moreover, a symbol should be wipe-proof after approximately 1–5 seconds.

It is known to use paper as recording masterial for ink jet recording processes. In DE-OS No. 28 15 871, a paper on a cellulose basis having a weight of 30–70 g/m$^2$ is described, in which a limited circular spread of an applied ink droplet and rapid onset of wipe-resistance are assured by the fact that the filler content of the paper is approximately 30–40% by weight and the sizing agent content approximately 2–6% by weight. The symbols, however, do not have sharp edges after the ink has spread out on the paper, but appear more or less frayed.

Such papers are, in spite of the irregularly bounded lateral propagation of the droplets, suitable for simple recording purposes. If, however, a number of different ink solutions are jetted simultaneously or at brief intervals onto the recording paper, then the risk exists that the solutions will run into one another and the recorded images will become unreadable. Moreover, on account of the strong penetration of the ink droplets into the paper, the symbols show through on the rear face. It is simply not possible to write legibly on the rear faces of such papers.

It is furthermore known to use coated papers for recording by the jet ink process. In DAS No. 22 34 823 a paper having a coating of gelatine is described, in which the ink solution penetrates, after jetting on, to a depth of some $\mu$m. By this coating, the wipe-resistance is intended to be improved and the resolution capability is increased, because the pigmented solution does not run after jetting on, but rapidly becomes stabilized in the image receiving coating.

DOS No. 29 25 769 also describes a coated paper, which having regard to the possibility of both front and rear viewing, possesses an optical non-transmission coefficient of 55 to 97.5%. Paper according to DOS No. 29 25 769 has a pigment-containing coating, which possesses an ink absorption capacity of 1.5 to 18 mm/min.

Ink solutions for ink jet processes differ basically in their rheological characteristics from conventional printing inks which remain in the surface zone of the recording material. Ink solutions for ink jet processes are comparable to writing inks or drawing inks. Whereas writing inks, however, can dry slowly, symbols formed in the ink jet process must be very rapidly wipe-resistant. In addition, jetted-on ink solution droplets must spread out in the most exact and accurate manner possible in the interests of clear, cohesive images. For papers, these are mutually contradictory requirements. Rapid onset of wiperesistance implies a rapid soaking of the ink solution into the paper and, therefore, a penetration of the ink into the volume of the paper. Thus, the ink droplet will not spread out at all or to only a limited extent. For a paper in which the ink droplet spreads out widely, a wipe-resistance is by contrast obtained only after a long period of time.

The effect of this set of problems is that the described recording papers are not satisfactory in every respect.

A disadvantage of a paper according to DAS No. 22 34 823 is especially that the jetted-on symbols are not wipe-resistant in the desired short time of approximately 1–5 seconds. Gelatine does, indeed, absorb the pigment solution, but the diffusion of the ink solution into the gelatine coating still remains a process of limited speed. Consequently, the jetted symbols are sufficiently wipe-resistant only after more than ten seconds and when a rapid printing sequence is used lose their contour definition due to wiping.

A further disadvantage is that the droplets do not spread out sufficiently or rapidly. After drying, a symbol, therefore, frequently consists of a series of points, which do not touch or only just touch one another. In a good ink jet image, by contrast, the droplets have rapidly spread out sufficiently far for the symbols to be recognized as cohesive units.

Also papers which have been produced according to DOS No. 29 25 769 do not work fully satisfactorily, because the symbols are not wipe-resistant in the desired short time. In this DOS, a simulated ink absorption capacity is used as a relative measure. These comparison coefficients are, however, obtained with water and are, therefore, not appropriate in practice. Where a commercially available solution is used as ink, it is found that the symbols on papers according to DOS No. 29 25 769 do not become wipe-free until after several seconds and do not fulfill the requirements for rapid printers.

The task underlying the present invention is to produce a recording paper for ink jet processes, which does not suffer from the stated disadvantages and which, in particular, is distinguished by clearly joined together printed images and extremely rapidly achieved wipe-resistance of the symbols. Jetted-on images shall, moreover, not show through on the rear side of the sheet and the images must be capable of being observed, both with incident light and also with light transmitted through.

This task is achieved in that, onto a base paper a coating of a white mixture comprising a pigment and/or filler and a binding agent is coated and dried on the paper, the pigment content of which is at least about 90% by weight of the dried coating, the pigment particles have a mean diameter of approximately 0.05–4.-0/um, and the binding agent is predominently hydrophilic.

The mean diameter of the pigment particles or filler particles preferably lies in the range of 0.5–3$\mu$.

The pigment and filler particles should preferably and predominently not be of flake-shaped form.

Pigment and filler particles having flake-shaped form, such as for example kaolin, have the disadvantage that the absorption of the ink solution at the various crystal surfaces is different and, therefore, too weak absorption of the ink solution results. If, however, pigment and filler particles of flake-shaped form are added for some reason or another, then their content should not exceed 40% by weight of the pigment and filler constitutents.

The base paper is preferably sized which should be understood to mean a paper that has been sized in the usual manner in the body of the paper, for example with 2% of a conventional sizing agent such as resin soap, and/or has been surface-sized by means of a surface coating. The paper may furthermore contain 5–15% of a commercially available filler.

The pigment-binding agent coating of this invention is preferably situated on one side of the paper. On the other hand, both sides of the paper may be coated, if both sides are to be used as functional sides for ink jet printing. The weight per unit area of the coating lies between 5 and 30 $g/m^2$ per side and, preferably, 8 to 25 $g/m^2$.

The pigment content of the functional coating according to this invention is at least 90% and preferably lies between 92 and 97% by weight. As white pigmenting and filler materials, those materials are predominently to be considered in which the particles do not possess a flake-like structure. In particular, calcium carbonate, magnesium carbonate, barium sulphate, titanium dioxide, magnesium titanate, calcium silicate, synthetic aluminum silicate, magnesium silicate, aluminum oxide or hydroxide and satin white are suitable. These pigments and fillers can be used, each alone or in mixtures with one another, or in such mixtures with kaolin, in which less than 40% of the total content of pigment and filler consists of kaolin.

Binding agents having a predominantly hydrophilic character are to be understood as those binding agents which dissolve in water (neutral, acid or alkaline) and as a film make possible a complete wetting by the aqueous pigment solutions. In this sense, for example, casein, gelatine, carboxy methyl cellulose, polyvinyl alcohol, starch, starch derivatives, alkalinically soluble copolymers of styrene and maleic acid anhydride, polyamino amide resins, alginates, chitosan and other substances may be used as binding agent. The majority of commercially available plastics dispersions are not suitable. Fairly small quantities of such dispersions in a hydrophilic binding agent system may, indeed, be used, for example with the objective of making the coating flexible. The decisive point here is that the uniform wetting of the coating by aqueous ink solutions should not be adversely affected. The objective is that a droplet of approximately 0.1 mm diameter on the surface immediately spreads out and uniformly wets a circular area of 0.3–0.4 mm diameter.

If the coating mass of the paper according to this invention is a commercially available hardening agent based upon epichlorhydrin or melamine formaldehyde, this advantageously contributes to imparting to the surface coating a good wet strength and, thus, a certain document-proof property after printing. An addition of a hardening or cross-linking agent is indispensable, if the molecular weight of the binder is comparatively low.

Other additives are possible only within limits. Plasticizing additives, such as polyglycols and optical brighteners, do not affect the function. Foam-removers and other fatty substances can, however, adversely affect the hydrophilic character of the coating and, thus, the functioning of the paper, i.e. can prevent the rapid forming of a circular pattern and uniform rapid spreading of an ink droplet on the coating.

In order, if applicable to prevent a deeper penetration of the ink solution into the base paper, the base paper can, in a further embodiment of the invention, be furnished with a solvent-impermeable barrier layer, for example polyvinyl alcohol. As a result, particularly with thinner coatings, a penetration of the ink solution into the base paper can advantageously be counteracted.

In the process for the production of the paper of this invention, use may advantageously be made of conventional devices, whereby the base paper can be made for example on a Fourdrinier (long sieve machine), a solvent-impermeable barrier may be applied and subsequently the functional coating may be applied to one or both sides of the base paper with a spreading device of known type in the paper-making machine or on a separate spreading machine.

The composition of the surface coating, consisting of filler, binder and possibly wet strength agent and other additives is, for the paper of this invention, fully determining for the fact that the ink droplet spreads in a circle from 0.1 to 0.3–0.4 mm diameter within approximately 1 second (max. 3 seconds).

The invention is explained in more detail below by means of examples of embodiments thereof and with reference to the attached drawing.

DESCRIPTION OF THE PREFERRED EMBODIMENTS

Figure 1:
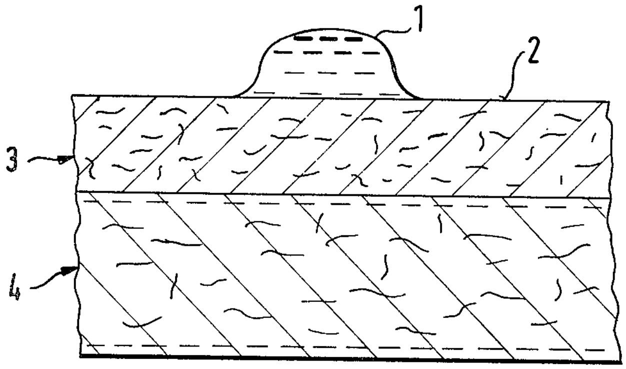
FIGS. 1–3 show successive phases in the spreading out of an ink droplet and in the penetration of the ink into the surface coating of the paper of this invention.

The illustrations in the drawing show in cross-section a diagrammatic form of embodiment of the paper, which consists in this special case of a base paper 4 and a surface coating 3, whereby for the sake of simplicity, only one surface coating 3 on the upper face of the base paper 4 has been shown.

Figure 2:
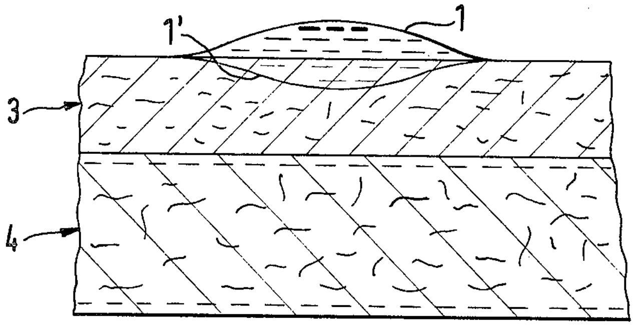
Figure 3:
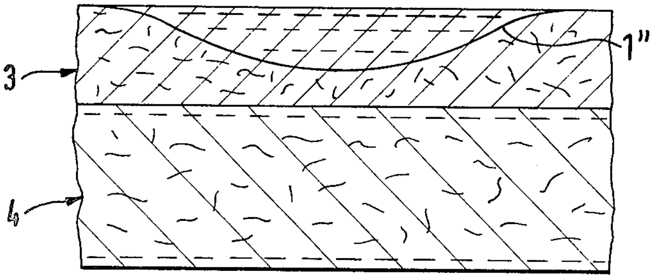

In FIGS. 1–3 it is possible to see the successive phases when an ink droplet 1 is applied to the surface 2 of the paper, the starting state being illustrated in FIG. 1. FIG. 2 shows the state where the ink droplet 1 has already spread out and also has partially penetrated into the coating as can be seen from the front line 1'. The spreading out of the ink droplet takes place relatively rapidly as compared with the penetration into the paper by capillary effect, so that the front line 1' possesses an extended, flat form. Finally, FIG. 3 shows the final state of the ink droplet penetrated into the surface coating with the front line 1''. Such a distribution of ink leads to the desired sharp, high-contrast printed image. Reference 4 denotes the base paper and reference 3 the recording coating situated thereon.

EXAMPLE 1

An approximately 45 $g/m^2$ base paper is produced, with addition of usual quantities of alkyl ketene dimer and polyamino amide epichlorhydrin resin as internal sizing, on a Fourdrinier, was pre-coated in a sizing press on both faces with a usual mixture of:

12% by wt. chalk,

12% by wt. kaolin,

6% by wt. peptonized starch,

1%by wt. melamine formaldehyde resin, and

69% by wt. water and subsequently furnished in a spreading machine with the functional coating. The functional coating consists of:

34% by wt. calcium carbonate (mean particle diameter2 μm),

60% by wt. aluminum hydroxide (mean particle diameter, 0.5μm), and

6% by wt. casein

The weight of the dried coating is 18 g/m².

EXAMPLE 2

An approximately 55 g/m² base paper is produced, with addition of usual resin size, optical brightener and alum, on a Fourdriner, and is precoated on both sides in a sizing press with a mixture of kaolin, starch ether and melamine resin in water, and subsequently given the functional coating in a spreading device. The functional coating consists of:

95% by wt. calcium carbonate (particle size: 90% <μm), and

5% by wt. casein

The weight of the dried coating is approx. 18 g/m².

EXAMPLE 3

An approximately 80 g/m² base paper is produced in the conventional manner, with addition of 5% by wt. kaolin, % by wt. resin, 0.1% by wt. optical brightener and alum, on a Fourdrinier, and is surface-sized in a sizing press with a 4% solution of animal size and given the functional coating in a spreading device. The functional coating consists of:

90.6% by wt. barium sulphate (mean particle diameter, 0.8μm),

6% by wt. gelatine,

3% by wt. polyglycol 400, and 0.4% by wt. chrome alum.

The weight of the dried coating is approx. 25 g/m².

EXAMPLE 4

An approximately 50 g/m² base paper, neutrally sized as in Example 1, is produced on a Fourdrinier, precoated in a sizing press on both faces with a mixture of:

25% by wt. kaolin,

4% by wt. starch phosphate (approx. 3.5% phosphate),

2% by wt. polyglycol 1000, and

1% by wt. melamine formaldehyde resin, and subsequently given a functional coating in a spreading device.

The functional coating consists of:

30% by wt. titanium dioxide (mean particle diameter, 0.3μm),

63% by wt. aluminum hydroxide (mean particle diameter, 0.5μm),

5% by wt. starch ether,

1% by wt. styrene/maleic acid, anhydride copolymer (E,ovs/M/ =200000), and

1% by wt. melamine formaldehyde resin.

The weight of the dried coating is approximately 15 g/m².

EXAMPLE 5

An approximately 100 g/m² base paper is produced, with the addition of resin size, brightener and alum as in Example 2, on a Fourdrinier, precoated on both faces in a sizing press with a mixture of kaolin, starch ether and melamine formaldehyde resin in water, and subsequently given a functional coating in a conventional spreading device. The functional coating consists of:

82% by wt. calcium carbonate (90% <2μm),

9% by wt. kaolin (90% <2μm), 4.6% by wt. oxidized starch, 1.2% by wt. melamine formaldehyde resin, 3% by wt. polyglycol 400, and 0.2% by wt. calcium stearate.

The weight of the dried coating is approx. 18 g/m².

EXAMPLE 6

An approximately 120 g/m² base paper is produced, with the addition of resin size, brightener and alum as in Example 2, on a Fourdrinier, is surface-sized on both faces in a sizing press with a 3% solution of polyvinyl alcohol (medium viscosity) in water, and subsequently given a functional coating in a spreading device. The functional coating consists of:

20% by wt. calcium silicate (mean particle diameter, 0.05 μm),

76% by wt. synthetic aluminum silicate (mean particle diameter, 0.5μm), 2.5% by wt. polyvinyl alcohol (medium viscosity), 0.5% by wt. sodium alginate, and 1% by wt. dialdehyde starch.

The weight of the dried coating is 17 g/m².

The testing of the papers produced according to this invention with a conventional ink solution for ink jet processes (Siemens) gave the following results:

| | Outward spread | | Wipe Resistant |
|---|---|---|---|
| | ∅ mm | Form | After |
| Example 1 | 0.35 | Circle | 1 Sec. |
| Example 2 | 0.35 | Circle | 1.5 Sec. |
| Example 3 | 0.35 | Circle | 2.5 Sec. |
| Example 4 | 0.35 | Circle | 2 Sec. |
| Example 5 | 0.35 | Circle | 1 Sec. |
| Example 6 | 0.35 | Circle | 2 Sec. |
| Comparisons According to: | | | |
| DOS 2,925,769 | 0.2–0.4 | Circle | 10 Sec.–1 Min. |
| According to: | | | |
| DAS 2,234,823 | 0.35 | Circle | 30 Sec.–1 Min. |
| According to: | | | |
| DOS 2,815,871 | 0.4–0.8 | Irregularly Jagged | Approx. 1 Sec. |

These test results clearly show the superiority of the coatings of the present invention, which are distinguished especially by the rapid wipe-resistance in conjunction with equally rapid spreading with sharp boundary to the points.

What is claimed is:

1. A recording sheet for ink jet processes comprising:

a base support; and a dried coating on said support comprising a mixture of a binding agent and a particulate material of predominantly non-flake shaped structure and selected from the group consisting essentially of pigments, fillers and mixtures thereof, said particulate material content being at least about 90% by weight of said dried coating and having a mean particle diameter of approximately 0.05–4.0 μm, and said binding agent is predominantly hydrophilic.

2. The recording sheet of claim 1, wherein the mean particle diameter of said particulate material is about 0.5–3.0 μm.

3. The recording sheet of claim 1, wherein said pigment is selected from the group consisting of calcium carbonate and a mixture of calcium carbonate with other pigments and/or fillers.

4. The recording sheet of claim 1, wherein said pigment is selected from the group consisting of aluminum hydroxide, aluminum oxide and a mixture of aluminum hydroxide or oxide with other pigments and/or fillers.

5. The recording sheet of claim 1, wherein when particles of pigment and filler of flake-shaped structure are present, their quantity referred to the total quantity of pigment and filler is less than 40% by weight.

6. The recording sheet of claim 1, wherein said base support is paper.

7. The recording sheet of claim 6, wherein said base support is surface-sized between the support and the pigment coating.

8. The recording sheet of claim 6, wherein said base support has at least one intermediate barrier layer between the support and the pigment coating.

9. The recording sheet of claim 6, wherein said base support is sized.

10. The recording sheet of claim 9, wherein said sized base support is paper having a weight per unit area of approximately 40–160 g/m².

11. The recording sheet of claim 6, wherein said base paper has a weight per unit area of approximately 40–160 g/m².

12. The recording sheet of claim 1 wherein said pigment is selected from the group consisting of calcium carbonate, magnesium carbonate, barium sulphate, titanium dioxide, magnesium titanate, calcium silicate, synthetic aluminum silicate, magnesium silicate, aluminum oxide or hydroxide, satin white and mixtures thereof.

13. The recording sheet of claim 12, wherein said hydrophilic binding agent is selected from the group consisting of either cross- or uncross-linked casein, gelatine, carboxy methyl cellulose, polyvinyl alcohol, starch, starch derivatives, alkalinically soluble copolymers of styrene and maleic acid anhydride, polyamino amide resins, alginates, chitosan and mixtures thereof.

14. The recording sheet of claim 13, wherein said coating includes a cross-linking agent for hardening said binding agent selected from the group consisting of agents containing oxirane groups and agents containing formaldehyde.

15. The recording sheet of claim 14, wherein said agent containing an oxirane group includes epichlorohydrin and said agent containing formaldehyde includes melamine formaldehyde.

16. The recording sheet of claim 13, wherein said coating contains a plasticizing agent therein.

17. The recording sheet of claim 1, wherein said hydrophilic binding agent is selected from the group consisting of either cross- or uncross-linked casein, gelatine, carboxy methyl cellulose, polyvinyl alcohol, starch, starch derivatives, alkalinically soluble copolymers of styrene and maleic acid anhydride, polyamino amide resins, alginates, chitosan and mixtures thereof.

18. The recording sheet of claim 17, wherein said coating includes a cross-linking agent for hardening said binding agent selected from the group consisting of an agent containing an oxirane group and an agent containing formaldehyde.

19. The recording sheet of claim 18, wherein said agent containing an oxirane group includes epichlorohydrin and said agent containing formaldehyde includes melamine formaldehyde.

20. The recording sheet of claim 17, wherein said coating contains a plasticizing agent therein.

21. The recording sheet of claim 1, wherein said coating includes a cross-linking agent for hardening said binding agent.

22. The recording sheet of claim 21, wherein the coating is cross-linked with a material from the group consisting of a hardening agent containing an oxirane group and a hardening agent containing formaldehyde.

23. The recording sheet of claim 22, wherein said agent containing an oxirane group includes epichlorohydrin and said agent containing formaldehyde includes melamine formaldehyde.

24. The recording sheet of claim 1, wherein said coating contains a plasticizing agent therein.

25. The recording sheet of claim 1, wherein said mixture is substantially white.

* * * * *

UNITED STATES PATENT AND TRADEMARK OFFICE

CERTIFICATE OF CORRECTION

PATENT NO. : 4,474,847

DATED : October 2, 1984

INVENTOR(S) : Heinz Schroder, Georg Schupp

It is certified that error appears in the above-identified patent and that said Letters Patent are hereby corrected as shown below:

1. Column 5, line 24 - delete "<μm" and insert --<2μm--.
2. Column 5, line 31 - delete "%" and insert --1%--.
3. Column 5, line 61 - delete "(E,ovs/M/ = 200000)" and insert --($\bar{M}$ = 200000)--.

Signed and Sealed this

*Twenty-third* Day of *July 1985*

[SEAL]

*Attest:*

DONALD J. QUIGG

*Attesting Officer*

*Acting Commissioner of Patents and Trademarks*